United States Patent Office 3,342,805
Patented Sept. 19, 1967

3,342,805
PROCESS FOR THE MANUFACTURE OF CELLULOSE ETHERS
Clayton D. Callihan, Baton Rouge, La., assignor to The Dow Chemical Company, Midland, Mich., a corporation of Delaware
No Drawing. Filed May 27, 1964, Ser. No. 370,673
5 Claims. (Cl. 260—232)

The present invention relates to an improved method for the manufacture of soluble cellulose ethers, and more particularly, it concerns a process for the manufacture of alkyl and hydroxyalkyl cellulose ethers substantially free of insoluble cellulose fibers.

The mentioned cellulose ethers are difficult to prepare without obtaining some unreacted cellulose fiber in the final product though it be a very small amount. Several methods have been devised to rid the ether derivatives of the highly objectionable fibers, but most of the proposals suffer from one or more faults in that they are time consuming, difficult to accomplish or inefficient and expensive.

Often solutions of the cellulose derivatives must be filtered prior to their utilization in a particular application. Illustrative of such an application is the utilization of the cellulose ethers to thicken aqueous flooding media employed in the secondary recovery of oil. Without prior filtering, the insoluble fiber content of such a solution is strained out of solution on the surface of the oil bearing formation. Ultimately a fibrous coating forms on the face of the formation which may seriously impair the efficiency of the flooding process.

Another application for the ethers, in which the fiber content is undesirable is their use as color developers and leveling agents in paint. The presence of fibers in the paint results in surface imperfections.

Conventionally the described cellulose ethers are prepared by first uniformly treating cellulose with an alkali metal hydroxide such as caustic, after which the resulting alkali cellulose is etherified with an alkyl halide, alkylene oxide or two or more of such materials. The product thus prepared can be utilized in crude form for some applications, but generally, it is further purified as by washing with water or when the ethers are soluble in water, purified by organic solvent extraction. In any event, the insoluble fibers remain with the ether product and appear as an insoluble suspended phase in any ultimate applicating solution of the ether.

It has been proposed that the presence of the fibers in the finished product evidences an incomplete reaction due to a caustic deficiency. It was discovered, however, that upon increasing the amount of caustic in the initial treatment of the cellulose, the problem of fiber discontinuity in the final product was definitely worsened.

A different approach to the solution of this problem was to use an excess of the alkyl halide or alkylene oxide reactant in the etherification reaction. Although this technique produced an improvement in the product, the excess amounts of such reactants utilized were expensive and resulted in larger amounts of undesired by-products such as a variety of ethers and alcohols, the formation of which from the etherifying reactants is catalyzed by the alkali.

It is an object of the present invention to provide an improved process for the manufacture of alkyl, hydroxyalkyl and mixed alkyl hydroxyalkyl cellulose ethers in a soluble form which is substantially free of insoluble cellulose fibers. A further but more limited object is to provide a convenient and highly efficient method for preparing substantially fiber free cellulose ethers, particularly alkyl, and mixed alkyl hydroxyalkyl, cellulose ethers which are cold water-soluble but thermally gellable in hot water. That these, and other objects and benefits are accomplished in accordance with the present invention will become apparent hereinafter as the invention is fully described.

The improved process of the invention comprises conducting a conventional etherification process for the preparation of the above-mentioned non-ionic cellulose ethers and, in addition to operations essential to such process, treating the crude ether reaction product with an organic monohalide in which the halogen is activated and has an atomic number from 17 to 35 inclusive. By the terminology "active halogen" is meant hydrolyzable with 10 percent by weight aqueous sodium hydroxide solution at 25° C. to the corresponding alcohol, but not so active as to hydrolyze in water. While any suitably active organic halide, which can be applied uniformly in a fluid state to the crude ether product, e.g., as a gas, liquid or solution, can be used, low molecular weight, active organic halides are most desirable. Illustratively, organic monohalides having from 2 to 10 carbons are preferred.

Exemplary of suitable organic monohalides are organic chlorides and bromides in which the halogen is activated by the presence in the compound of a carbonyl group or unsaturation. Compounds of this nature include chloroacetamide, carbamyl chloride, chloroacetic acid, sodium monochloroacetate, chloroacrylic acid, β-chlorodisodium malonate, methyl chloroacetate, allyl chloride, allyl bromide, and benzyl chloride.

Best results are obtained using organic halides which are water-soluble. This is because the reaction products thereof with alkali cellulose are readily soluble in water and thus easily removed from the crude product by simple washing with water. Excellent results are achieved when using chloroacetic acid and watersoluble alkali metal salts thereof.

Amounts of the organic halide used to achieve optimum treatment will vary with the amount of the insoluble fiber content of the crude product and the amount of residual alkali metal hydroxide. Usually treatment with as little as about 0.1 percent and up to as much as about 15 percent by weight, based on the weight of the crude ether product, of the organic chloride will produce a significant reduction in the insoluble fiber content of the ether composition.

To carry out the contacting of the crude ether with the organic chloride, the temperature of the crude reaction product is adjusted to within the range from about 20° to 90° C., preferably at a temperature within the range from about 50° to 85° C. The reaction pressure is conveniently that autogenously generated by the reaction system at the reaction temperature but may be higher if desired. The organic chloride, which is preferably diluted with water or a water-soluble organic solvent such as isopropyl alcohol, is mixed with the crude ether with sufficient agitation to uniformly distribute the same throughout the crude ether product. A convenient technique is to spray the crude ether product as it is tumbled in a reactor with a solution of the organic halide. A substantial decrease in fiber content of the soluble ether is achieved within a short time after application of the active halide, e.g., as little as 5 minutes reaction time. Preferably the reaction is continued for at least 15 minutes and may extend for as long as several hours. Reaction times are usually within the range from 0.5 to 2 hours.

Upon completion of the treatment of the invention, the crude ether product may be used as recovered from the reactor, but it is usually washed to effect removal of undesired by-products of the etherification reaction such as alkali metal salts and alcohol or ether by-products. In the instance of alkali-soluble ethers, the washing medium may simply be water. For water-soluble ethers which have thermal gelation temperatures, the washing medium utilized may be heated water, the temperature of which is above the thermal gelation temperature of the ether, or an organo aqueous solvent combination such as a water-methanol mixture. Cellulose ethers of high alkyl substitution tend to become soluble only in organic solvents, and at this level of substitution, the crude ethers can again be washed with water without loss of the desired product. The hydroxyethyl and like hydroxyalkyl ethers are conventionally purified by washing them with the water-methanol solvent system which is a non-solvent for the ether. When the organic halide is water-soluble, the above indicated washing with aqueous solvents removes reaction products of the treating agent also. However, if the organic halide is itself not water-soluble, or more particularly, if the reaction product thereof with alkali cellulose is not water-soluble, purification of the treated ether may require additional washing of the treated cellulose ether with an appropriate organic solvent such as methanol, ethanol, acetone or the like.

The cellulose ethers to which the process of the invention is applicable include the alkyl and hydroxyalkyl, as well as the mixed alkyl and hydroxyalkyl, derivatives of cellulose. The alkyl group may contain from 1 to 4 carbons and is present on the cellulose polymer chain to an extent sufficient to render the derivative soluble in an appropriate solvent system. The recognized classes of ethers, delineated according to their solubilities, include the alkali-soluble, water-soluble and organo-soluble cellulose ethers. A special class of ethers to which the invention is uniquely applicable is that characterized by thermogelation properties. This includes the above-mentioned alkyl and mixed alkyl and hydroxyalkyl ethers but the hydroxyalkyl ethers are limited to those having from 3 to 4 carbons in the etherifying moiety. For each class of ethers, there are use applications in which the insoluble fiber content of solutions of the ethers is desirably controlled in light of considerations involving both product appearance and product performance.

Generally the treating process of the invention can be utilized in conjunction with any of the known methods for the preparation of the aforementioned cellulose ether derivatives. An essential requirement with regard to the timing of the treatment is simply that the treatment be applied to the crude cellulose product following substantial completion of the desired etherification reaction.

It is also desirable, although not necessary to the practice of the invention, that any excess of the alkali metal hydroxide over that stoichiometric to the etherification reaction be kept to a minimum. This is due to the fact that an excess of alkali remains in the crude ether product and will react with the organic halide treating agent thereby increasing the amount of such agent required to diminish the insoluble fiber content. It has been found that the fiber content of the ether is most effectively diminished when the amount of the treating agent used is at least sufficient to react with any alkali remaining in the crude product regardless of its form. The amount of alkali remaining in the crude product is conveniently determined by sampling the reactor and titrating the sample with hydrogen chloride to determine the amount of alkali present and consequently the optimum amount of the organic chloride needed to effect a treatment.

When treating hydroxyalkyl cellulose ethers, chloroacetic acid is the preferred treating agent. The acid is used to effect both neutralization of excess caustic normally present in such reaction mixtures as well as the fiber diminishing treatment of the invention. For alkyl halide etherification and mixed alkyl halide and alkylene oxide etherifications of alkali cellulose, it is preferable to use sodium monochloroacetate since the final reaction mass usually contains only a small amount of residual alkali.

The following examples are representative of the invention as well as being preferred embodiments thereof insofar as the invention is presently understood by applicant. Particular reaction conditions utilized therein are not intended as limitations unless otherwise delineated in the claims appended to this specification.

EXAMPLE 1

Cotton linters were contacted with 50 percent aqueous caustic to produce an alkali cellulose characterized by a caustic cellulose weight ratio of 1.07. This alkali cellulose was shredded and charged to an enclosed pressure reactor along with sufficient methyl chloride and propylene oxide to provide methyl chloride/cellulose and propylene oxide/cellulose weight ratios of 1.35 and 0.25, respectively. After charging the reactor, the temperature of the system was increased to about 75° C. over a period of 8 hours.

The resulting reaction mixture was withdrawn from the reactor and a sample thereof washed with boiling hot water and dried. The ether product was thermally gellable and thus the hot water removed only water-soluble salts and most of the liquid, organic, reaction by-products.

An aliquot of the purified ether product was dissolved in water and compared under polarized light with a standard series of cellulose ether solutions containing increasing amounts of suspended cellulose fibers. The fiber rating given this product was 5.0 on a rating scale ranging from 0 to 8.0. For each unit increase in the fiber rating scale, the fiber content of the solution is increased by a factor of about 2.0. A solution with a fiber rating of 1 contains 0.2 milligram of fibers per 4 ounces of a 2 percent by weight aqueous solution of the ether.

The remaining crude ether mixture was returned to the reactor and an amount of sodium monochloroacetate equimolar to residual caustic present in the crude product and was charged to the reactor. The caustic present in the ether was 1.4 percent by weight of the total product as determined by titrating a weighed sample of the crude product. The temperature within the reactor was increased to 80° C. and maintained at this level for one hour. Thereafter the reaction mixture was discharged and the entire product washed thoroughly with boiling hot water and then dried. The fiber rating of this ether product was 1.0 thereby showing a significant decrease in fiber content as the result of treatment in accordance with the invention. Moreover, no traces of the reaction product made during the fiber destruction step were found in the washed product. This product apparently did not have a gelation temperature and was washed out with the hot water.

For the purposes of comparison, two more mixed methyl hydroxypropyl cellulose ethers were prepared according to the procedure substantially as described above. However, in one run, approximately 33 percent excess caustic was used, and in the second run approximately 20 percent excess methyl chloride was utilized. When the excess caustic was utilized, the fiber rating of the final washed product was increased to 7.0. While employment of the excess of methyl chloride improved the fiber rating of this product somewhat by reducing the rating to 3.0, the improvement was not as good as that achieved in the practice of the invention. Moreover, the improvement achieved was insignificant in relation to its increased cost as the result of the excess alkyl halide wasted.

EXAMPLE 2

A hydroxypropyl cellulose ether was prepared by reacting an alkali cellulose having a caustic to cellulose ratio of about 0.475 with propylene oxide. The amount of the latter reagent used was sufficient to provide an ether having a hydroxypropyl degree of substitution (D.S.) of about 1.4. This crude ether product was then uniformly mixed with chloroacetic acid with thorough agitation in molar proportions of ½ mole of the acid diluted to 50 percent by weight in water for each mole of titratable alkali in the crude ether. The temperature of the reaction system was increased to about 60° C. for a period of about 60 minutes. Thereafter, the resulting cellulose ether product was washed with a water-methanol azeotrope to remove undesired salt impurities inclusive of any carboxymethyl cellulose derivatives formed during the treatment. The initial product from the crude mass after purification had a fiber rating of 6.0 while that portion reacted with the monochloroacetic acid had a fiber rating of 2.0.

While the mechanism by which fiber reduction is achieved is not fully understood, it is believed to be at least partially due to the reaction of the active organic chloride with cellulose fibers occluded in caustic. That fibers are occluded in this manner appears evident from the fact that increasing caustic concentration only worsens the fiber rating and the use of excess of the alkyl halide reactant improves it somewhat. In any event, the invention provides an alkyl or hydroxyalkyl cellulose ether which is effectively free of insoluble cellulose fibers. This is accomplished conveniently and without requiring incorporation of significant amounts of other compositions into the finally purified ether compositions.

What is claimed is:

1. In a process which comprises reacting an alkali cellulose and an etherifying material selected from the group consisting of alkyl halides having from 1 to 4 carbons, alkylene oxides having from 2 to 4 carbons and mixtures of the alkyl halides and alkylene oxides to prepare a soluble cellulose ether, in the form of a crude reaction product, the improvement which consists in treating the crude reaction product with from about 0.1 percent up to as much as about 15 percent by weight, based on the weight of the crude reaction product, of a fluid form of an organic monohalide having from 2 to 10 carbons in which the halogen is activated and has an atomic number from 17 to 35 inclusive and heating the treated product at a temperature within the range from about 20° to 90° C. whereby a soluble cellulose ether of diminished insoluble fiber content is obtained.

2. A process which comprises mixing monochloroacetic acid with the crude reaction product of cellulose, alkali and an alkylene oxide having from 1 to 4 carbons, heating the resulting mixture at a temperature within the range from about 20° to 90° C. and thereafter washing the reaction product to obtain a soluble ether having diminished insoluble fiber content; the moles of monochloroacetic acid used being approximately equal to about ½ the moles of HCl titratable caustic in the crude reaction product.

3. A process as in claim 1 and including the additional step of washing the treated crude product with an aqueous washing medium in which the ether is not soluble to prepare a purified soluble cellulose ether of diminished insoluble fiber content.

4. A process as in claim 1 wherein the organic monohalide is selected from the group consisting of chloroacetic acid and alkali metal salts thereof.

5. A process as in claim 1 wherein the cellulose ether in the form of a crude reaction product is a soluble, thermogelling cellulose ether and the treated product is washed with hot water.

References Cited

Ott, "Cellulose and Cellulose Derivatives," Interscience Publishers (1954) pp. 938–942.

DONALD E. CZAJA, *Primary Examiner.*

LEON J. BERCOVITZ, *Examiner.*

R. W. MULCAHY, *Assistant Examiner.*